(12) United States Patent
Epstein

(10) Patent No.: US 11,199,137 B2
(45) Date of Patent: Dec. 14, 2021

(54) GAS TURBINE ENGINE SYSTEM COOLDOWN

(71) Applicant: United Technologies Corporation, Farmington, CT (US)

(72) Inventor: Alan H. Epstein, Lexington, MA (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 319 days.

(21) Appl. No.: 16/142,317

(22) Filed: Sep. 26, 2018

(65) Prior Publication Data

US 2020/0095939 A1    Mar. 26, 2020

(51) Int. Cl.

| | | |
|---|---|---|
| *F02C 7/275* | (2006.01) | |
| *B64D 27/10* | (2006.01) | |
| *B64D 31/02* | (2006.01) | |
| *B64D 33/08* | (2006.01) | |
| *F02C 7/12* | (2006.01) | |
| *F02C 7/27* | (2006.01) | |
| *F01D 25/36* | (2006.01) | |

(52) U.S. Cl.
CPC .............. *F02C 7/275* (2013.01); *B64D 27/10* (2013.01); *B64D 31/02* (2013.01); *B64D 33/08* (2013.01); *F01D 25/36* (2013.01); *F02C 7/12* (2013.01); *F02C 7/27* (2013.01); *F05D 2260/221* (2013.01); *F05D 2260/85* (2013.01); *F05D 2270/13* (2013.01)

(58) Field of Classification Search
CPC .......... F01D 25/34; F01D 25/36; F01D 21/06; F01D 19/02; F01D 21/00; F02K 3/12; F05D 2270/13; F05D 2260/221; F05D 2260/85; F02C 7/275; F02C 7/12; F02C 7/27; B64D 27/10; B64D 31/02; B64D 33/08
See application file for complete search history.

(56) References Cited

U.S. PATENT DOCUMENTS

| | | | |
|---|---|---|---|
| 9,664,070 B1 * | 5/2017 | Clauson | ................. F02C 7/275 |
| 10,221,774 B2 | 3/2019 | Gelwan et al. | |
| 10,378,442 B2 | 8/2019 | Jackowski et al. | |
| 10,384,791 B2 | 8/2019 | Gelwan et al. | |

(Continued)

OTHER PUBLICATIONS

EP Application No. 19199806.1 Extended EP Search Report dated May 6, 2020, 6 pages.

*Primary Examiner* — Gerald L Sung
*Assistant Examiner* — Rene D Ford
(74) *Attorney, Agent, or Firm* — Cantor Colburn LLP

(57) ABSTRACT

An engine system for an aircraft includes a first gas turbine engine, a first core turning system, a second gas turbine engine, and a second core turning system. The engine system also includes a controller operable to shutdown the first gas turbine engine responsive to determining that the aircraft has landed and operate in the second gas turbine engine in a taxi mode while using the first core turning system to cool the first gas turbine engine. The controller is further operable to shutdown the second gas turbine engine and disable the first core turning system based on a power-down condition, restart the first gas turbine engine and use the second core turning system to cool the second gas turbine engine based on a restart condition, and complete cooling of the second gas turbine prior to restarting the second gas turbine engine.

18 Claims, 3 Drawing Sheets

(56) References Cited

U.S. PATENT DOCUMENTS

| | | |
|---|---|---|
| 10,494,115 B2 | 12/2019 | Zaccaria et al. |
| 2010/0133813 A1* | 6/2010 | Cote ...................... F02C 7/275 290/32 |
| 2018/0023413 A1 | 1/2018 | Chowdhury et al. |

* cited by examiner

GAS TURBINE ENGINE SYSTEM COOLDOWN

BACKGROUND

The subject matter disclosed herein generally relates to gas turbine engines and, more particularly, to a method and an apparatus for gas turbine engine system cooldown and restart.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine, which may result in a "bowed rotor" condition. If a gas turbine engine is in such a bowed rotor condition, it is undesirable to restart the engine. Typical approaches to reduce thermal distortion effects include waiting for a sufficiently long period of time to allow the thermal distortion to dissipate. Alternatively, active techniques can be employed to reduce thermal distortion, but such techniques can add significant delays at an airport gate or alleyway.

BRIEF DESCRIPTION

According to one embodiment, an engine system for an aircraft includes a first gas turbine engine, a first core turning system, a second gas turbine engine, and a second core turning system. The engine system also includes a controller operable to shutdown the first gas turbine engine responsive to determining that the aircraft has landed and operate in the second gas turbine engine in a taxi mode while using the first core turning system to cool the first gas turbine engine. The controller is further operable to shutdown the second gas turbine engine and disable the first core turning system based on a power-down condition, restart the first gas turbine engine and use the second core turning system to cool the second gas turbine engine based on a restart condition, and complete cooling of the second gas turbine prior to restarting the second gas turbine engine.

In addition to one or more of the features described above or below, or as an alternative, further embodiments may include where the controller is further operable to determine whether further cooling of the first gas turbine engine is needed prior to restarting the first gas turbine engine, and use the first core turning system to cool the first gas turbine engine based on determining that further cooling of the first gas turbine engine is needed prior to restarting the first gas turbine engine, where a further cooling time of the first gas turbine engine is less than a cooling time of the second gas turbine engine performed based on the restart condition.

In addition to one or more of the features described above or below, or as an alternative, further embodiments may include where the controller is further operable to restart the second gas turbine engine based on completion of the cooling of the second gas turbine, and operate the first and second gas turbine engines in the taxi mode after restart of the first and second gas turbine engines.

In addition to one or more of the features described above or below, or as an alternative, further embodiments may include where the controller is further operable to operate the first gas turbine engine in the taxi mode after restart of the first gas turbine engine while the second core turning system is used to cool the second gas turbine engine.

In addition to one or more of the features described above or below, or as an alternative, further embodiments may include where a time to complete cooling of the first gas turbine engine while the second gas turbine engine is in the taxi mode is less than a time to complete cooling of the second gas turbine engine based on the restart condition.

In addition to one or more of the features described above or below, or as an alternative, further embodiments may include where the first core turning system includes a first core turning drive operably coupled to a first engine interface of the first gas turbine engine, and the second core turning system includes a second core turning drive operably coupled to a second engine interface of the second gas turbine engine.

In addition to one or more of the features described above or below, or as an alternative, further embodiments may include where the first core turning drive and the second core turning drive each include one or more of: an electric motor, a pneumatic drive, and a hydraulic drive.

In addition to one or more of the features described above or below, or as an alternative, further embodiments may include where the first core turning drive and the second core turning drive are each powered by one or more of: an auxiliary power unit, a battery system, an electric generator, a hydraulic source, and a pneumatic source.

According to another embodiment, a gas turbine engine for an aircraft includes a spool interconnecting a compressor and a turbine, and a means for rotating the spool in a motoring mode while the gas turbine engine is shutdown and a second gas turbine engine of the aircraft is operating.

In addition to one or more of the features described above or below, or as an alternative, further embodiments may include where the means for rotating the spool in the motoring mode includes a core turning drive and a controller operable to transition the gas turbine engine between a taxi mode, a shutdown mode, the motoring mode, and a restart mode.

In addition to one or more of the features described above or below, or as an alternative, further embodiments may include where the controller is operable to start the gas turbine engine while the second engine is operating in the motoring mode.

According to another embodiment, a method of gas turbine engine system control includes shutting down a first gas turbine engine responsive to determining that an aircraft including the first gas turbine engine and the second gas turbine engine has landed. The method also includes operating in the second gas turbine engine in a taxi mode while using a first core turning system to cool the first gas turbine engine. The method further includes shutting down the second gas turbine engine and disabling the first core turning system based on a power-down condition. The first gas turbine engine is restarted, and a second core turning system is used to cool the second gas turbine engine based on a restart condition. Cooling of the second gas turbine is completed prior to restarting the second gas turbine engine.

In addition to one or more of the features described above or below, or as an alternative, further embodiments may include shutting down and cooling one or more additional gas turbine engines in the taxi mode while cooling the first gas turbine engine.

In addition to one or more of the features described above or below, or as an alternative, further embodiments may include swapping a designation of the first gas turbine engine and the second gas turbine engine for each flight of the aircraft.

A technical effect of the apparatus, systems and methods is achieved by sequencing control of gas turbine engine system cooldown and restart.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
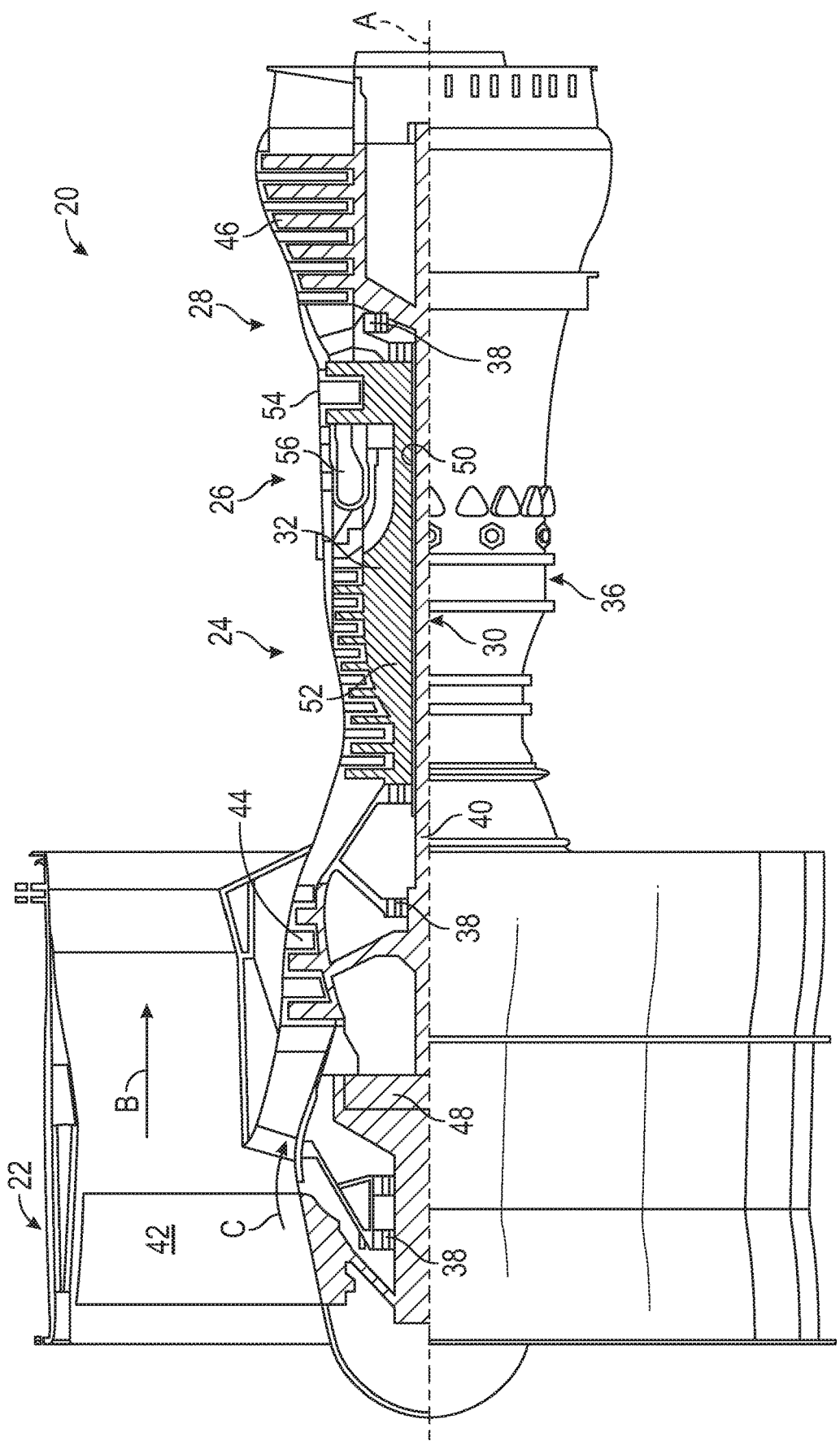
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single-spool and three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{\wedge}0.5$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
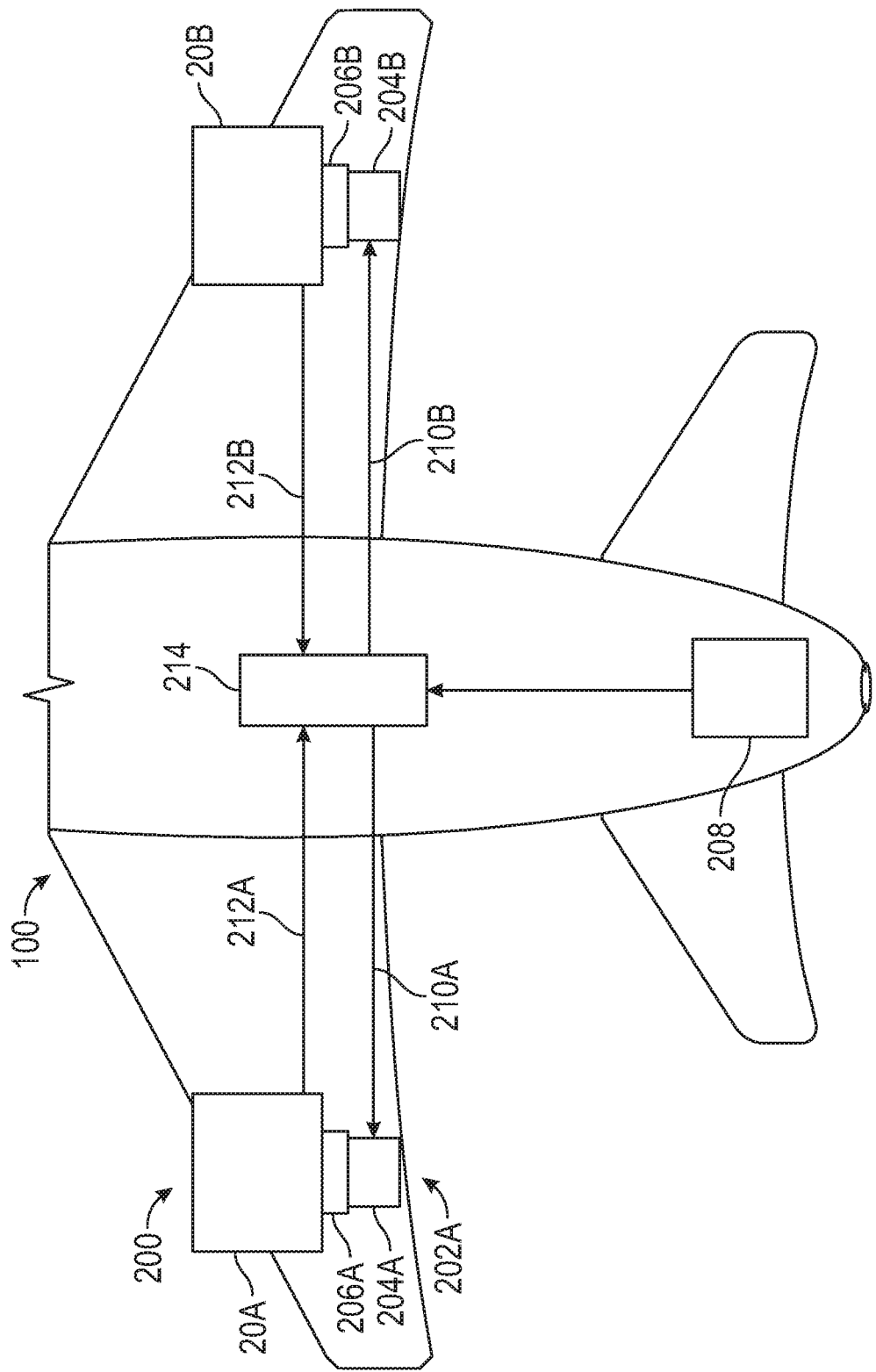
FIG. 2 is a schematic diagram of an engine cooldown system, in accordance with an embodiment of the disclosure.

Referring now to FIG. 2, a schematic illustration of an aircraft 100 includes an engine cooldown system 200 (also referred to as engine system 200) with first and second gas turbine engines 20A, 20B as embodiments of the gas turbine engine 20 of FIG. 1. During normal operation, heating within the first and second gas turbine engines 20A, 20B can result in thermal distortion of one or more spools (e.g., low speed spool 30 and/or high speed spool 32 of FIG. 1) during engine shutdown such that on restart vibration and/or rubbing of blade tips within an engine casing can result, particularly where the rotational speed increases towards a major resonance speed (which may be referred to as a critical speed). A first core turning system 202A is operably coupled to the first gas turbine engine 20A, and a second core turning system 202B is operably coupled to the second gas turbine engine 20B. The first core turning system 202A provides a means for rotating a spool 30, 32 in a motoring mode while the first gas turbine engine 20A is shutdown and the second gas turbine engine 20B of the aircraft 100 is operating. Similarly, the second core turning system 202B provides a means for rotating a spool 30, 32 in a motoring mode while the second gas turbine engine 20B is shutdown and the first gas turbine engine 20A of the aircraft 100 is operating.

The first core turning system 202A can include a first core turning drive 204A operably coupled to a first engine interface 206A of the first gas turbine engine 20A, and the second core turning system 202B can include a second core turning drive 204B operably coupled to a second engine interface 206B of the second gas turbine engine 20B. The first core turning drive 204A and the second core turning drive 204B can each include one or more of: an electric motor, a pneumatic drive, and a hydraulic drive. The first and second core turning drives 204A, 204B may be explicitly added to each engine 20A, 20B for this purpose or adapted from an engine starter. The first engine interface 206A and the second engine interface 206B can include gear trains, gearboxes, shafts, clutches, and/or other interfaces that enable the first core turning drive 204A and the second core turning drive 204B to control rotation of an engine core of the first and second gas turbine engines 20A, 20B below the critical speed. For instance, the first core turning drive 204A and the second core turning drive 204B can each be a low-horsepower motor that results in rotation of the first and second gas turbine engines 20A, 20B at speeds at or below 10 revolutions per minute as one example. Alternatively, the first core turning drive 204A and the second core turning drive 204B can each be a pneumatic starter, such as an air turbine starter, that rotates components of the first and second gas turbine engines 20A, 20B at speeds below typical starting speeds. The first core turning drive 204A and the second core turning drive 204B can be driven to rotate by a pressurized hydraulic fluid. In the example of FIG. 2, a power source 208 is depicted as providing input power 210A, 210B to the first and second core turning drives 204A, 204B respectively. For instance, the power source 208 can be an auxiliary power unit, a battery system, an electric generator, a hydraulic source, a pneumatic source, and/or another source of power known in the art.

In some embodiments, the first and second gas turbine engines 20A, 20B can provide cross-engine input power 212A, 212B to each other. For example, while the first gas turbine engine 20A is in a motoring mode, the second gas turbine engine 20B can provide cross-engine input power 212B that is passed as input power 210A to the first core turning drive 204A. Similarly, while the second gas turbine engine 20B is in a motoring mode, the first gas turbine engine 20A can provide cross-engine input power 212A that is passed as input power 210B to the second core turning drive 204B.

A controller 214 can manage modes of operation of the first and second gas turbine engines 20A, 20B and control the first and second core turning drives 204A, 204B. The controller 214 can be distributed between one or more controls and/or interfaces at an engine system and/or aircraft level. For example, the controller 214 can be embodied in one of more full authority digital engine controls (FADECs), engine control interfaces, and/or flight computers of the aircraft 100. The controller 214 can include memory to store instructions that are executed by one or more processors on one or more channels. The executable instructions may be stored or organized in any manner and at any level of abstraction, such as in connection with a controlling and/or monitoring operation of the first and second gas turbine engines 20A, 20B. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

Figure 3:
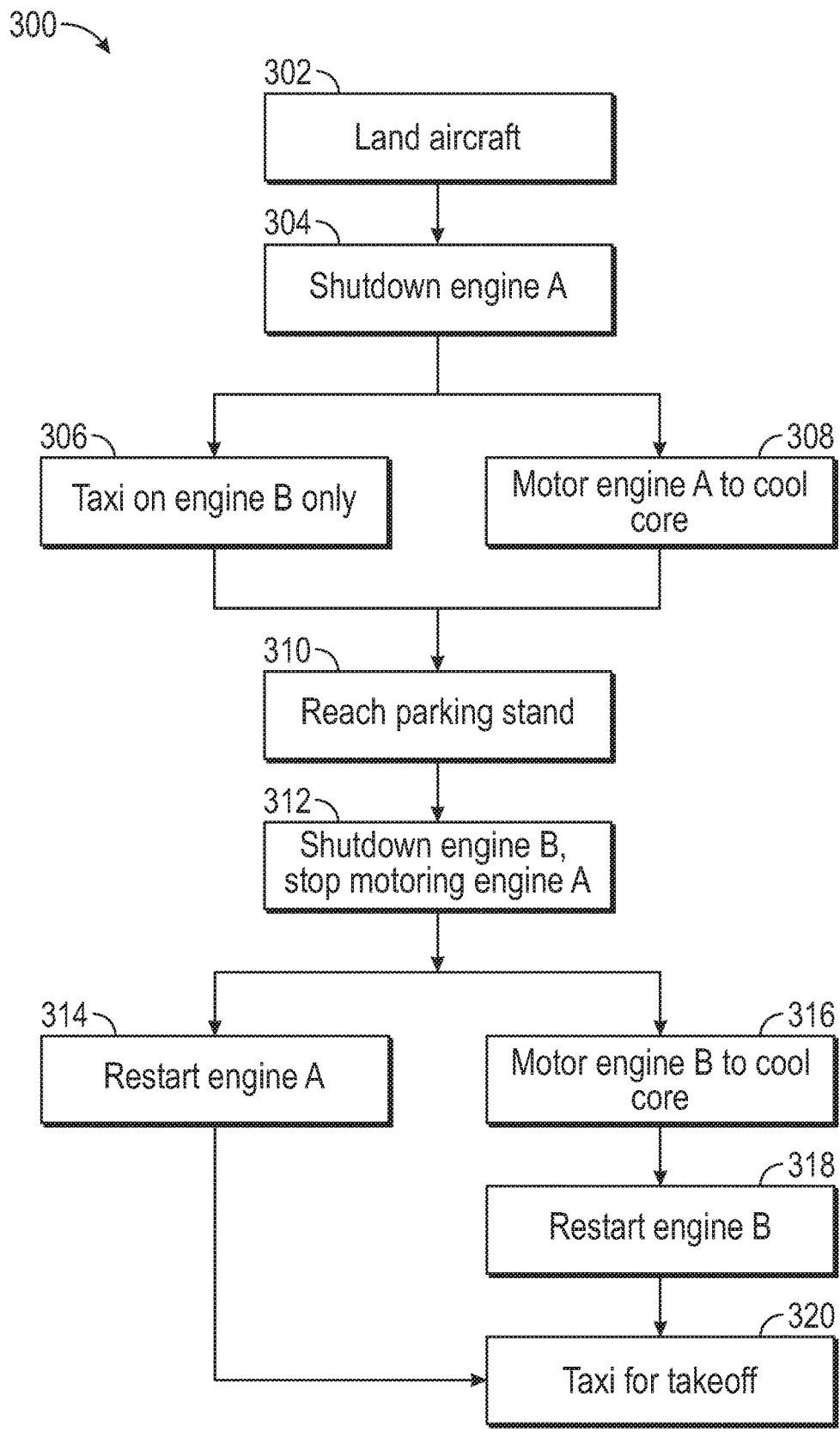
FIG. 3 is a flow chart illustrating a method, in accordance with an embodiment of the disclosure.

Referring now to FIG. 3 with continued reference to FIGS. 1-2, FIG. 3 is a flow chart illustrating a method 300 for engine cooldown control, in accordance with an embodiment. The method 300 may be performed, for example, by the engine cooldown system 200 of FIG. 2. For purposes of explanation, the method 300 is described primarily with respect to the engine cooldown system 200 of FIG. 2; however, it will be understood that the method 300 can be performed on other configurations (not depicted).

At block 302, the controller 214 can detect that the aircraft 100 has landed, for instance, based on pilot input and/or sensed conditions (e.g., weight on wheels). At block 304, the controller 214 can shutdown the first gas turbine engine 20A responsive to determining that the aircraft 100 has landed. At block 306, the controller 214 can operate in the second gas turbine engine 20B in a taxi mode while using the first core turning system 202A to cool the first gas turbine engine 20A in block 308. In some embodiments, power produced by the second gas turbine engine 20B is used as cross-engine input power 212B to provide input power 210A to the first core turning drive 204A during taxi mode. At block 310, the aircraft 100 reaches a stopping destination, such as a parking stand to unload and load passengers and/or cargo. At block 312, the controller 214 can shutdown the second gas turbine engine 20B and disable the first core turning system 202A to stop motoring of the first gas turbine engine 20A based on a power-down condition, such as a pilot request.

After waiting for a period of time while ground-based activities occur, such as unloading and loading of the aircraft 100 and performing any refueling and/or maintenance, the method 300 continues after block 312. At block 314, the controller 214 can restart the first gas turbine engine 20A and use the second core turning system 202B to cool the second gas turbine engine 20B based on a restart condition at block 316. Motoring of the second gas turbine engine 20B at block 316 may begin prior to or after restarting the first gas turbine engine 20A at block 314. In some embodiments, the controller 214 can determine whether further cooling of the first gas turbine engine 20A is needed prior to restarting the first gas turbine engine 20A, for instance, by tracking an amount of motoring time in block 308, a temperature of the first gas turbine engine 20A, an amount of time since the shutdown of block 304, and/or other such parameters. The controller 214 can use the first core turning system 202A to cool the first gas turbine engine 20A based on determining that further cooling of the first gas turbine engine 20A is needed prior to restarting the first gas turbine engine 20A, where a further cooling time of the first gas turbine engine 20A may be less than a cooling time of the second gas turbine engine 20B performed based on the restart condition. The restart condition can be a pilot input.

At block 318, the controller 214 can restart the second gas turbine engine 20B based on completion of the cooling of the second gas turbine 20B, for instance, by tracking an amount of motoring time in block 316, a temperature of the second gas turbine engine 20B, an amount of time since the shutdown of block 312, and/or other such parameters. At block 320, the aircraft 100 can enter a taxi mode for takeoff. The controller 214 can operate the first and second gas turbine engines 20A, 20B in the taxi mode after restart of the first and second gas turbine engines 20A, 20B. Alternatively, the controller 214 can operate the first gas turbine engine 20A in the taxi mode after restart of the first gas turbine engine 20A while the second core turning system 202B is used to cool the second gas turbine engine 20B. The controller 214 is operable to transition each of the first and second gas turbine engines 20A, 20B between a taxi mode, a shutdown mode, a motoring mode, and a restart mode. After each iteration of the method 300, a designation of the first gas turbine engine 20A and the second gas turbine engine 20B can be swapped for each flight of the aircraft 100. In other words, on a next iteration, taxiing can be performed using the first gas turbine engine 20A upon landing, while motoring cools the second gas turbine engine 20B prior to reaching the parking stand at block 310. This may be desirable to even aging of the two engines.

Embodiments can decrease the total amount of waiting time needed to motor both the first and second gas turbine engines 20A, 20B. For instance, a time to complete cooling of the first gas turbine engine 20A while the second gas turbine engine 20B is in the taxi mode may be less than a time to complete cooling of the second gas turbine engine 20B based on the restart condition. Further, by performing motoring of the first or second gas turbine engines 20A, 20B in the taxi mode, less time is spent at the parking stand or in an alleyway waiting to perform motoring in a sequence for both the first and second gas turbine engines 20A, 20B. This also can reduce loading impacts on the power source 208 that would otherwise be needed if the first and second gas turbine engines 20A, 20B were motored in parallel.

Also, while the above description describes the cooldown and restart process for a twin engine aircraft, a similar procedure can be applied to aircraft with more than two engines. For example, in the case of more than two engines, more than one engine (e.g., one or more additional gas turbine engine 20) may be shutdown and motored during taxi after landing.

While the above description has described the flow process of FIG. 3 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine system for an aircraft, the engine system comprising:
   a first gas turbine engine;
   a first core turning system operably coupled to the first gas turbine engine;
   a second gas turbine engine;
   a second core turning system operably coupled to the second gas turbine engine; and
   a controller comprising one or more processors and memory programmed to:
      shutdown the first gas turbine engine responsive to determining that the aircraft has landed;
      operate the second gas turbine engine in a taxi mode while using the first core turning system to cool the first gas turbine engine;
      shutdown the second gas turbine engine and disable the first core turning system based on a power-down condition;
      restart the first gas turbine engine and use the second core turning system to cool the second gas turbine engine based on a restart condition; and
      complete cooling of the second gas turbine prior to restarting the second gas turbine engine.

2. The engine system of claim 1, wherein the controller is further programmed to:
   determine whether further cooling of the first gas turbine engine is needed prior to restarting the first gas turbine engine; and
   use the first core turning system to cool the first gas turbine engine based on determining that further cooling of the first gas turbine engine is needed prior to restarting the first gas turbine engine, wherein a further cooling time of the first gas turbine engine is less than a cooling time of the second gas turbine engine performed based on the restart condition.

3. The engine system of claim 1, wherein the controller is further programmed to:
   restart the second gas turbine engine based on completion of the cooling of the second gas turbine; and
   operate the first and second gas turbine engines in the taxi mode after restart of the first and second gas turbine engines.

4. The engine system of claim 1, wherein the controller is further programmed to:

operate the first gas turbine engine in the taxi mode after restart of the first gas turbine engine while the second core turning system is used to cool the second gas turbine engine.

5. The engine system of claim 1, wherein the first core turning system comprises a first core turning drive operably coupled to a first engine interface of the first gas turbine engine, and the second core turning system comprises a second core turning drive operably coupled to a second engine interface of the second gas turbine engine.

6. The engine system of claim 5, wherein the first core turning drive and the second core turning drive each comprise one or more of: an electric motor, a pneumatic drive, and a hydraulic drive.

7. The engine system of claim 6, wherein the first core turning drive and the second core turning drive are each powered by one or more of: an auxiliary power unit, a battery system, an electric generator, a hydraulic source, and a pneumatic source.

8. A gas turbine engine for an aircraft, the gas turbine engine comprising:
    a spool interconnecting a compressor and a turbine;
    a means for rotating the spool in a motoring mode while the gas turbine engine is shutdown and a second gas turbine engine of the aircraft is operating; and
    a controller comprising one or more processors and memory programmed to start the gas turbine engine while the second engine is operating in the motoring mode.

9. The gas turbine engine of claim 8, wherein the means for rotating the spool in the motoring mode comprises a core turning drive and wherein the controller is operable to transition the gas turbine engine between a taxi mode, a shutdown mode, the motoring mode, and a restart mode.

10. A method of gas turbine engine system control, the method comprising:
    shutting down, by a controller comprising one or more processors and memory, a first gas turbine engine responsive to determining that an aircraft comprising the first gas turbine engine and a second gas turbine engine has landed;
    operating the second gas turbine engine in a taxi mode, by the controller, while using a first core turning system to cool the first gas turbine engine, wherein first core turning system is operably coupled to the first gas turbine engine;
    shutting down, by the controller, the second gas turbine engine and disabling the first core turning system based on a power-down condition;
    restarting, by the controller, the first gas turbine engine and using a second core turning system to cool the second gas turbine engine based on a restart condition, wherein the second core turning system is operably coupled to the second gas turbine engine; and
    completing, by the controller, cooling of the second gas turbine prior to restarting the second gas turbine engine.

11. The method of claim 10, further comprising:
    determining whether further cooling of the first gas turbine engine is needed prior to restarting the first gas turbine engine; and
    using the first core turning system to cool the first gas turbine engine based on determining that further cooling of the first gas turbine engine is needed prior to restarting the first gas turbine engine, wherein a further cooling time of the first gas turbine engine is less than a cooling time of the second gas turbine engine performed based on the restart condition.

12. The method of claim 10, further comprising:
    restarting the second gas turbine engine based on completion of the cooling of the second gas turbine; and
    operating the first and second gas turbine engines in the taxi mode after restarting the first and second gas turbine engines.

13. The method of claim 10, further comprising:
    operating the first gas turbine engine in the taxi mode after restarting the first gas turbine engine while the second core turning system is used to cool the second gas turbine engine.

14. The method of claim 10, wherein a time to complete cooling of the first gas turbine engine while the second gas turbine engine is in the taxi mode is less than a time to complete cooling of the second gas turbine engine based on the restart condition.

15. The method of claim 10, wherein the first core turning system comprises a first core turning drive operably coupled to a first engine interface of the first gas turbine engine, and the second core turning system comprises a second core turning drive operably coupled to a second engine interface of the second gas turbine engine.

16. The method of claim 15, wherein the first core turning drive and the second core turning drive each comprise one or more of: an electric motor, a pneumatic drive, and a hydraulic drive, and the first core turning drive and the second core turning drive are each powered by one or more of: an auxiliary power unit, a battery system, an electric generator, a hydraulic source, and a pneumatic source.

17. The method of claim 10, further comprising:
    shutting down and cooling one or more additional gas turbine engines in the taxi mode while cooling the first gas turbine engine.

18. The method of claim 10, further comprising:
    swapping a designation of the first gas turbine engine and the second gas turbine engine for each flight of the aircraft.

* * * * *